Figures 1, 2:
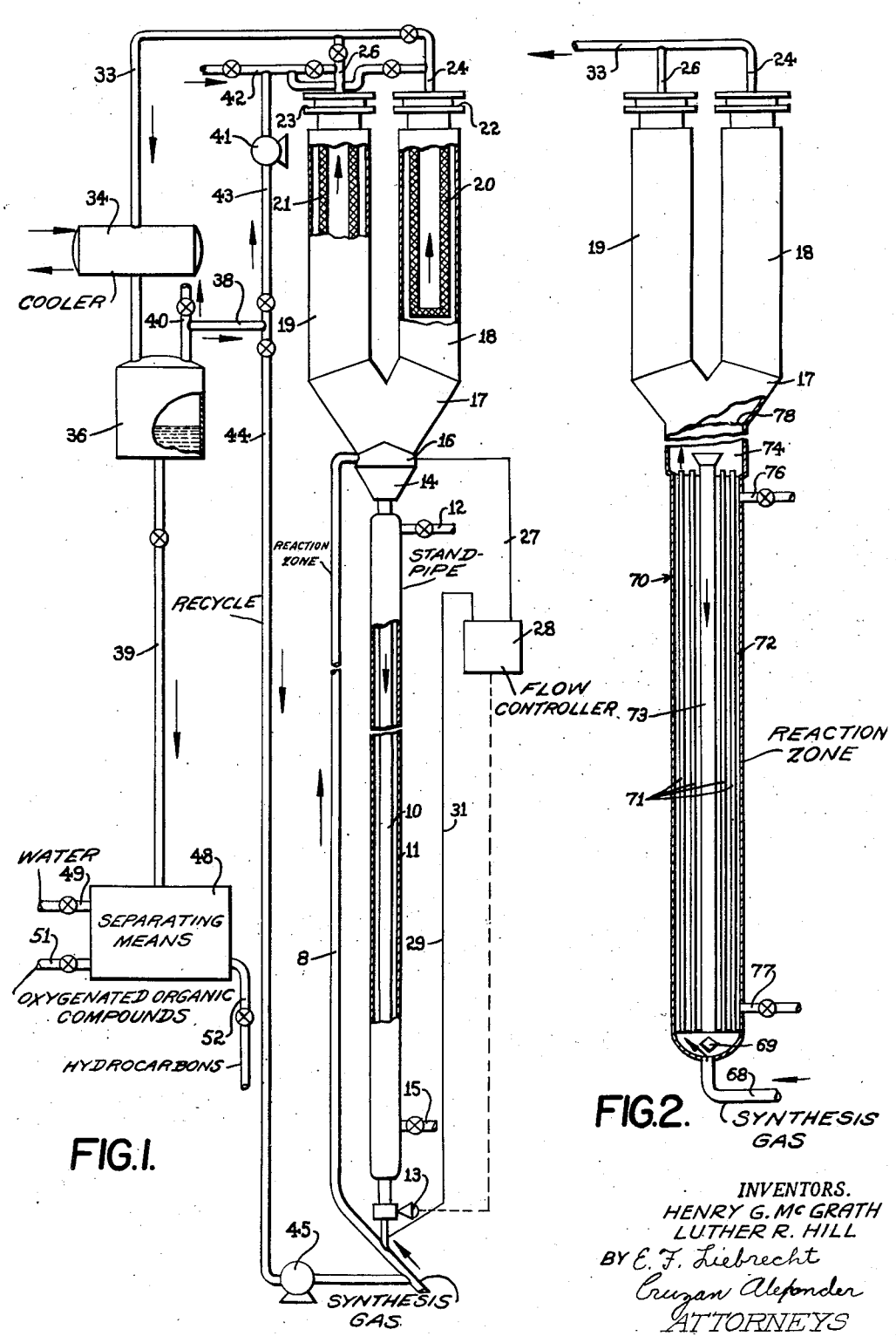

Jan. 18, 1955  H. G. McGRATH ET AL  2,699,988
APPARATUS FOR SYNTHESIS OF ORGANIC COMPOUNDS
Filed Feb. 18, 1949  2 Sheets-Sheet 1

INVENTORS.
HENRY G. McGRATH
LUTHER R. HILL
BY E. F. Liebrecht
Cruzan Alexander
ATTORNEYS

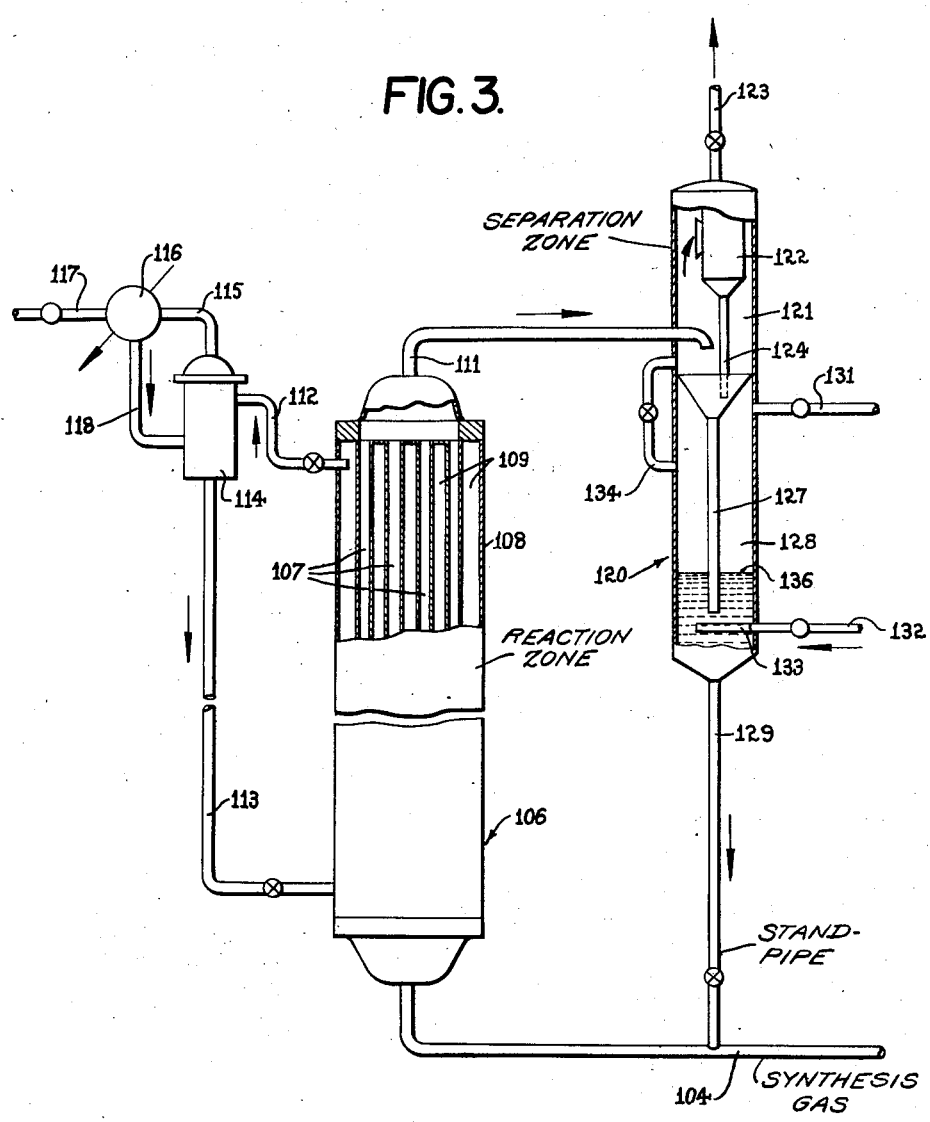

United States Patent Office 2,699,988
Patented Jan. 18, 1955

2,699,988

APPARATUS FOR SYNTHESIS OF ORGANIC COMPOUNDS

Henry G. McGrath, Elizabeth, and Luther R. Hill, Ridgewood, N. J., assignors to The M. W. Kellogg Company, Jersey City, N. J., a corporation of Delaware Application February 18, 1949, Serial No. 77,078

9 Claims. (Cl. 23—288)

This invention relates to the synthesis of organic compounds. In one aspect this invention relates to a method and apparatus for the synthesis of organic compounds by the hydrogenation of carbon monoxide in the presence of a finely-divided powdered catalyst. This application is a continuation-in-part of our prior applications Serial No. 726,620 filed February 5, 1947, now Patent No. 2,640,844, and Serial No. 33,078 filed June 15, 1948, Patent No. 2,640,843.

It has been known for some time that hydrogen and carbon monoxide may be made to react exothermically in the presence of certain catalysts and under specific reaction conditions to form hydrocarbons and oxygenated organic compounds having more than one carbon atom per molecule. In general, the synthesis of hydrocarbons by the hydrogenation of carbon monoxide is accomplished in the presence of a metal or an oxide of a metal chosen from group VIII of the periodic table as a catalyst at pressures below about 500 pounds per square inch gage and at temperatures below about 750° F.

Various methods and apparatus have been proposed to effect the reaction of hydrogen and carbon monoxide to produce organic compounds. Among these methods are those known as fixed-bed catalyst operations and fluid-bed catalyst operations. The fixed-bed operation comprises passing a reaction mixture of hydrogen and carbon monoxide through a stationary bed of catalyst in a reaction zone, and the fluid-bed operation comprises passing a reaction mixture through a finely-divided catalyst mass suspended in the reaction mixture in the reaction zone. Characteristically, certain reaction conditions are necessary for each of these processes and for the particular catalyst used.

The synthesis feed gas or reaction mixture comprises a mixture of about 1 to 2 mols of hydrogen per mol of carbon monoxide and may be prepared by such methods as the catalytic conversion of natural gas, steam, and carbon dioxide.

The most recent development in the synthesis of organic compounds from hydrogen and carbon monoxide has been in the fluid-bed type operation. This type of operation has had several apparent advantages over the fixed-bed operation and has yielded organic compounds of high quality and in large quantity. In such a fluid-bed operation at a temperature of about 600° F. and at super-atmospheric pressures using a fluidized iron catalyst, a contraction of about 41 per cent to about 70 per cent and a carbon monoxide disappearance of about 85 per cent to about 100 per cent (overall basis) have been observed. The selectivity of the reaction indicates that about 25 per cent to about 40 per cent of the CO is converted to $CO_2$, and oil and water yields of about 100 to 130 cc. per cubic meter of fresh feed and about 60 to 120 cc. per cubic meter fresh feed, respectively, are obtainable.

Even in view of the relatively good results obtained by the fluid-bed type operation certain inherent disadvantages have been found in the process and the apparatus. In such fluid-bed operations in which the catalyst is suspended in the reaction gas, classification of the catalyst often occurs. There is also a tendency for the catalyst particles to agglomerate and stick together after extended use apparently due to wax and carbon accumulation on the catalyst, which in turn causes settling and deaeration of the catalyst bed. These tendencies have required design considerations in maintaining certain distances between the heat transfer surfaces. Furthermore, special consideration must be made for the removal of heat liberated in the reaction, and with fluid-bed operation specially constructed apparatus is necessary for the removal of such heat with attention directed to the fluidized catalyst itself. It is much to be desired, therefore, to provide a process and apparatus which overcome these difficulties, at least partially.

It is an object of this invention to provide a process and apparatus for the synthesis of organic compounds having more than one carbon atom per molecule.

It is another object of this invention to produce hydrocarbons and oxygenated compounds by the reaction of carbon monoxide and hydrogen in the presence of a hydrogenation catalyst.

Another object of this invention is to provide an improvement in the apparatus employed for the synthesis of hydrocarbons in the presence of a finely-divided fluidized catalyst in the reaction mixture.

Various other objects and advantages will become apparent to those skilled in the art from the accompanying description and disclosure.

According to this invention, we have found that an oxide of carbon may be hydrogenated to yield organic compounds having more than one carbon atom per molecule in the presence of a finely-divided hydrogenation catalyst which is present in the gaseous reaction mixture in a much smaller amount than heretofore thought possible. We have found that a catalyst concentration in the gaseous reaction mixture of less than about 18 pounds per cubic foot of gas is adequate to carry out the reaction between hydrogen and carbon monoxide with a comparable yield of products to other synthesis processes using a much larger concentration. Furthermore, the residence time of both the catalyst and reactants in the reaction zone is relatively short and may be less than 5 seconds per pass. To effect the reaction in the presence of a finely-divided iron catalyst according to this invention, a reaction mixture of hydrogen and carbon monoxide is passed upwardly through an elongated, substantially vertical, reaction zone of special construction at a velocity greater than about 8 feet per second and as high as 40 feet per second, although velocities as low as 5 or 6 feet per second may be used under certain conditions without departing from the scope of this invention.

At such velocities, the finely-divided hydrogenating catalyst, such as iron, is entrained or suspended in the reaction mixture in an amount between about 1 and about 18 pounds per cubic foot of gas and forms a continuous catalyst phase in the reaction zone. In some cases a concentration as high as 25 pounds per cubic foot is desirable but preferably lower concentrations are used. The reaction mixture and the catalyst which is entrained in the flowing gases are passed through the elongated reaction zone and are removed from the upper portion thereof together. According to this invention, the catalyst particles are entrained in the gaseous reaction mixture in the reaction zone and continuously move therethrough in the direction of flow of the gases under conditions such that the conventional dense, pseudo-liquid catalyst phase is not formed.

In conventional fluid-type operations the catalyst forms a so-called "dense phase catalyst bed" in the reaction zone and consequently remains largely in the reaction zone itself until removed. Actually, two phases are formed in the reaction zone, a dense catalyst phase in the lower portion and a dilute phase having only a small amount of catalyst in the upper portion. The concentration of catalyst in such a dense phase is at least 25 pounds or 35 pounds per cubic foot of gas and usually between 50 pounds and 120 pounds per cubic foot.

The catalyst employed in the present invention is a finely-divided powdered catalyst of a metal or metal oxide which is or becomes in the reaction zone a catalyst for the hydrogenating reaction. Finely-divided metallic iron or iron oxide or a mixture of metallic iron and iron oxide are an example of the catalyst employed in this invention. Preferably, a metallic or reduced iron catalyst is used in the finely-divided form. Other metals and metallic oxides may be employed which are effective in catalyzing the hydrogenation of carbon monoxide, such as cobalt, nickel, and other metals of group VIII of the periodic table. While the catalyst powder usually consists of such catalytic metals or their oxides, it may also include a minor amount of promoting ingredients, such as alkalies, alumina, silica, titania, thoria, manganese oxide, and magnesia. Also, the catalyst may be supported on a suitable support, such as a bentonite type clay, silica gel, "Super Filtrol" and mixtures of these supports. In the following description, catalyst powders consisting of a metal and/or a metal oxide and containing at most a minor proportion of promoters are referred to as finely-divided metal catalyst.

The exact chemical condition of the catalyst in its most active form is not certain. It may be that the active form is present when the metal is at an optimum degree of oxidation and/or carburization; consequently, a metallic iron catalyst which is in a reduced condition when first contacted with the reactants may reach its state of highest activity through being oxidized and/or carburized in the reaction zone. Therefore, in this specification and claims, the catalyst employed is described by reference to its chemical composition when first contacted with the reactants.

The catalyst is employed in a fine state of subdivision. Preferably, the powdered catalyst initially contains no more than a minor proportion by weight of material whose average particle diameter is greater than 250 microns. The greater proportion of the catalyst mass, preferably, comprises a material whose average particle diameter is smaller than 100 microns including at least 25 weight per cent of the material in a particle size smaller than 40 microns. An example of a desirable powdered catalyst is one which comprises at least 75 per cent by weight of material smaller than 150 microns and at least 25 per cent by weight of materials smaller than 40 microns.

The temperature of reaction for the hydrogenation of carbon monoxide is generally between about 300° F. and about 750° F. With a metallic iron catalyst, temperatures between 450° F. and 750° F. are usually employed. With a cobalt catalyst usually a temperature below 450° F. is sufficient for the hydrogenating reaction. Generally, the pressures employed are somewhat above atmospheric and range from about 10 pounds to as much as 500 pounds per square inch gage, preferably between about 80 pounds and about 300 pounds per square inch gage.

In effecting the reaction it may often become necessary to cool the reaction zone to maintain a relatively constant temperature. Various means for cooling the reaction zone itself, such as by external cooling means or by injection of a cooling medium directly into the reaction mixture, may be practiced without departing from the scope of this invention. Furthermore, it may often become necessary to preheat the reaction mixture prior to entry into the reaction zone, and also the catalyst may be preheated before introduction into the reaction mixture. However, the cooling and preheating are factors which will be characteristic of the particular apparatus being used and the particular conditions under which the reaction is effected.

Generally, the reaction zone itself will comprise a single or a multiple number of conduits or tubes. With a multiple tube reactor, tubes of an inside diameter between about 1 inch and about 6 inches, are employed. Preferably, the diameter of the reaction tubes is between about 1 inch and about 2.5 inches. It is known that the diameter of the tube is of considerable importance when entraining a catalyst in the reaction mixture since the wall itself has a considerable effect on the disposition of the catalyst in the reaction stream. From the standpoint of cooling the reaction zone, smaller tubes are also desirable since they present larger heat transfer surfaces. However, with certain catalysts and with certain conditions of operation and particularly with single tube reactors, a tube or reaction zone much larger in diameter may be used.

The reaction zone of this invention is of such shape that the ratio of length to diameter is preferably at least 10. This ratio may be designated as the shape factor of the reactor $(L/D)$. L is the overall length of the reaction section in which the principal reaction is effected. D is the average diameter or transverse distance of any single tube of the reaction section for which L is measured. The shape factor is usually confined to the substantially vertical section of the reactor and does not include inlet and outlet conduits, such as a conduit leading to a catalyst separator. A shape factor of the reactor above 10 in addition to the velocity of the reactants aids in minimizing internal circulation and control of the residence time of the catalyst. For this reason, even with a reactor consisting of a single conduit of 3 or 4 feet in diameter or greater, a shape factor of at least 10 is employed.

According to a preferred embodiment of this invention, a fresh feed gas having a hydrogen to carbon monoxide ratio higher than the ratio in which these compounds are converted to other compounds is employed and the ratio of hydrogen to carbon monoxide in the reaction zone itself may be increased above the ratio in the feed gas and to a desired value by recycling a portion of the unconverted gas from the reaction zone, after removal of a part or all of the normally liquid product by condensation. A ratio of hydrogen to carbon monoxide in the fresh feed gas is used in which only a portion of the hydrogen is converted to products of the process. A portion of the effluent after removal of the greater part of the liquid product is recycled to the reaction zone in a volumetric ratio of recycle to fresh feed gas of about 0.5:1 to about 10:1, generally about 1:1 to about 5:1 or 6:1. The ratio of hydrogen to carbon monoxide in the reaction zone itself is usually about 1:1 to about 3:1 and according to this process may be maintained at about 1:1 without detrimental effect on the synthesis reaction. The ratio of hydrogen to carbon monoxide in the fresh feed itself may be considerably lower than in the reaction zone. For very low feed ratios of less than 0.9:1 the ratio in the reaction zone itself may be even less than the feed ratio as a result of the consumption of hydrogen relative to carbon monoxide being greater than the feed ratio. Once through operations without recyle, although not generally used, are within the scope of this invention.

The linear velocity of the gaseous reaction mixture passing upwardly through the reaction zone is conveniently expressed in terms of superficial velocity, which is the linear velocity the fresh feed stream would assume if passed through the reactor in the absence of catalyst, and takes into account the shrinkage in volume caused by the hydrogenation reaction. As previously stated, these superficial velocities are above about 5 feet per second, preferably above about 8 or 12 feet per second, and may be as high as 40 feet per second or higher without departing from the scope of this invention. The superficial linear velocity is calculated from the arithmetic average of the gas rate at the bottom and top of the reaction zone. The latter is arrived at by correcting the outlet gas volume for water and hydrocarbons condensed in the receivers, with corrections for pressure and average catalyst temperature. Contact times are calculated by dividing the length of the reaction zone by the superficial velocity.

The concentration of the catalyst in the gaseous reaction mixture in the reaction zone is usually less than about 25 pounds per cubic foot of gas, and preferably between about 3 pounds and about 12 pounds per cubic foot. The actual concentration required in the above range will depend to a certain extent upon the amount of inert gas in the reaction zone and also upon the accumulation of carbon and wax on the catalyst particles as the operation proceeds. The accumulation of wax and carbon on the catalyst decreases the weight of catalyst per cubic foot of gas; thus, the above values represent the extreme limits and may vary in accordance with this discussion.

Although the invention has been described with reference to an upwardly-flowing gaseous stream of reactants and catalyst, it should be understood that the catalyst and reactants may flow together downwardly, horizontally, or even angularly, through a reaction zone without departing from the scope of this invention. Important features of this invention are the weight of the catalyst per cubic foot of gas and the residence time. It has been found that by upward flowing of gas through a substantially vertical reaction zone the weight of catalyst per cubic foot of gas and the residence time of the catalyst can be controlled conveniently and accurately and for one reason is the preferable method of operation.

In operating a synthesis process according to this invention with a reduced iron catalyst and at a temperature between about 550° F. and about 650° F. at superatmospheric pressures a contraction of about 25 to about 85 per cent has been observed. The carbon monoxide disappearance (overall) is about 70 per cent to about 88 per cent and the selectivity of the reaction illustrated by the conversion of carbon monoxide to carbon dioxide is about 15 per cent to about 30 per cent. Condensed oil and water yields of about 30 to about 100 and about 80 to about 175 ccs. per cubic meter of fresh feed gas respectively, are obtained by operating according to the present process and may contain appreciable quantities of organic chemicals.

Certain particular advantages of the present process and apparatus have been observed. At the extremely high velocity capable of being used by the present process and apparatus much less catalyst is used and much greater efficiency of heat transfer is obtained. Temperature conditions can be easily and readily controlled at such high velocities. By the use of a short residence time of the catalyst higher selectivity can be obtained as the result of decreased side reactions, such as over-polymerization. Less than 3 per cent per week wax accumulation on the catalyst has been observed with the present method which compares with as much as 23 per cent per week wax accumulation with a low velocity fluid-bed type operation. Carbon deposits upon the catalyst have also been observed to be much less than those observed in low velocity operations. A carbon deposit of less than about 2 per cent per week for the present process as compared to above about 5 per cent per week for the low velocity process has also been observed.

As a result of high velocity and increased heat transfer, it is possible to use much greater temperature gradients between the catalyst and a cooling medium, if one is used, with the present process. In the low velocity fluid-bed operation a temperature difference between coolant and reaction mixture between 10° F. and 100° F. is conventional. However, with the present process a gradient considerably in excess of 100° F. may be employed. Also, relatively cold feed gas may be employed to the reaction zone. Mixing is so rapid under such conditions that no deleterious effect is observed with the cold feed gas when it contacts the catalyst.

The invention will be described further by reference to the accompanying drawings which are views in elevation, partly in cross-section, of suitable apparatus for carrying out the process of the present invention. Fig. 1 of the drawings is an elevational view diagrammatically illustrating a reaction zone and suitable auxiliary equipment for carrying out one embodiment of the present invention. Figures 2 and 3 of the drawings are other reaction chambers embodying the essential features of the present invention and may be substituted for the reaction chamber shown in Fig. 1 of the drawings.

In Fig. 1 of the drawings a synthesis gas comprising hydrogen and carbon monoxide present in a ratio between about 0.7:1 and about 1.4:1 is obtained from any suitable source. For example, a suitable source of hydrogen and carbon monoxide is the conversion of steam, carbon dioxide, and methane in the presence of a suitable catalyst, such as nickel. The resulting mixture of such a conversion usually contains sulphur and sulphur compounds, and the gas is preferably purified to remove such compounds therefrom. If a sulphur resistant catalyst is used the purification step is unnecessary. After purification in conventional manner known to those skilled in the art, the mixture of hydrogen and carbon monoxide is introduced into the lower end of a 26 foot length conduit or tubing 8 constituting the reactor. Conduit 8 is a curved conduit but having a major portion thereof positioned substantially vertically and straight and is made of extra heavy 1 inch steel tubing having an inside diameter of 0.95 inch and an outside diameter of 1.31 inches. Conduit 8 is also lagged with about 6 inches of heavy lagging. The straight vertical section of conduit 8 is about 19 feet in length. The gaseous reaction mixture is passed upwardly through conduit 8 and finely-divided catalyst from a standpipe 10 is introduced into the flowing gaseous stream in the lower portion of conduit 8, as shown. The velocity of the gas in conduit 8 is maintained above about 8 feet per second in the vertical section in order to prevent the formation of a pseudo-liquid dense phase of catalyst in the vertical section of the conduit, but instead to form a continuous catalyst phase of relatively dilute concentration. The velocity of the gaseous stream in conduit 8 is such that the catalyst is entrained in the gaseous stream and passes overhead therewith into the upper portion of standpipe 10 which is enlarged to form a separation zone. Since a continuous catalyst phase is present in conduit 8, the amount of catalyst taken overhead into the standpipe is approximately equivalent to the amount of catalyst introduced into the lower portion of conduit 8 from standpipe 10.

The lower portion of standpipe 10 comprises two substantially vertical, concentric, extra heavy steel pipes; an outside pipe 11 of approximately 4 inches in diameter and an inside tubing 10 having an inside diameter of 1.95 inches and an outside diameter of 2.5 inches. The outside 4 inch pipe 11 is welded at its ends to the inside tubing 10 to form an enclosing jacket which may be filled with a liquid as a cooling or heating medium. This jacket extends about 20 feet of the total length of 23 feet of tubing 10. A conventional cooling or heating medium is introduced into the annular space formed by the two concentric pipes through line 12 and may be withdrawn therefrom through line 15. In some instances the cooling or heating medium may be introduced through line 15 and removed through line 12, if desired. In another modification where the liquid introduced into the annular space is evaporated therein and the latent heat of evaporation is used to cool the catalyst, liquid is introduced through line 12 and vapors are removed, also through line 12.

Catalyst passes from conduit 8 into a conical section 14 which has a larger diameter than conduit 8 and thereby the velocity of the gases is diminished and the catalyst separates from the gaseous stream and flows downwardly into conduit 10. Section 14 may be considered the lower portion of a separation chamber made up of sections 16, 17, 18 and 19. A slide valve 13 in the lower portion of standpipe 10 regulates the return of catalyst from conduit 10 into conduit 8, the inlet to the reaction chamber. The upper end of conduit 10 is connected by means of a conical section 14 to an enlarged conduit 16 comprising a length of 8-inch extra heavy steel tubing having an inside diameter of about 7.63 inches. Conduit 16 facilitates the disengagement of the catalyst from the gas stream after the passage of the latter into conical section 14. Conduit 16 is connected by means of manifold 17 with conduits 18 and 19 which comprise other sections of extra heavy 8-inch steel tubing. Conduits 18 and 19 comprising the upper portion of the so-called separation zone contain filters 20 and 21 which are constructed of porous material, such as Alundum or a perforated metal screen or sheet, permeable to the gases and vapors emerging from conduit 8 but substantially impermeable to catalyst "fines" entrained in the gaseous effluent. Filters 20 and 21 are cylindrical and are closed at the bottom ends, as shown in the broken away section. A substantial annular space is provided between the wall of the filters and the wall of the enclosing conduit for the passage of gases and vapors and entrained catalyst upwardly through the annular space between the filters and conduits 18 and 19. The upper ends of filters 20 and 21 are mounted inside conduits 18 and 19 by means of enclosure means 22 and 23. The gases and vapors must pass through either or both filter 20 and filter 21 to reach outlet conduits 24 and 26. Each of the ceramic filters 20 and 21 shown is approximately 36 inches long and 4½ inches in outside diameter, the filter walls being approximately ¾ of an inch thick.

Union of the various conduits in the upper portion of the standpipe 10 is made by welding.

When using a reduced iron catalyst in a finely-divided state, usually between about 40 and about 150 microns, the temperature of reaction in conduit 8 is between 550° F. and about 650° F. A pressure of about 80 pounds per square inch gage has been found to be quite satisfactory. However, various pressures above and below this may be used without departing from the scope of this invention. With a velocity greater than 10 feet per second in conduit 8 the reaction time is less than 3 seconds per pass. Operating at a gas velocity of about 15 feet per second in conduit 8 a loading of about 6 pounds of catalyst per cubic foot of gas entering conduit 8 will produce a concentration of about 12 pounds of catalyst per cubic foot of gas in the vertical section of conduit 8. Similarly, if the loading is cut to about 4 pounds per cubic foot of gas the concentration of catalyst in the vertical section of conduit 8 is about 8 pounds per cubic foot. In all cases the velocity of the gas passing through conduit 8 is maintained above about 5 or 6 feet per second in order to prevent a formation of a dense pseudo-liquid phase of catalyst and to assure a continuous phase of catalyst in conduit 8. In operating at such high velocities the catalyst is entrained in the gaseous mixture and flows from the lower portion of conduit 8 to the upper portion thereof and settles or separates from the gaseous mixture in conical section 14 and enlarged conduit 16. The gaseous portion of the mixture from conduit 8 flows upwardly through the filters 20 and 21 and into the respective outlet conduits 24 and 26. Separated catalyst flows downwardly through conduit 10 and by the regulation of valve 13 is introduced into conduit 8 at the desired rate. The density of the catalyst in conduit 10 is usually about 50 pounds to 110 pounds per cubic foot.

In some instances, the heat of reaction may be removed by cooling the catalyst and relying upon the catalyst to absorb the sensible heat as a means for cooling the reaction mixture in the reaction zone. To accomplish this end, the catalyst in this particular apparatus may be cooled in conduit 10 by introducing a liquid, such as water or Dowtherm, through conduit 12 into the annular space between concentric conduits 10 and 11. The evaporation of the water or Dowtherm in the annular space removes a large portion of the heat in the catalyst. The cooled catalyst is then introduced into conduit 8 for recycling through the reaction zone or conduit 8. Conduit 8 may be cooled directly itself by indirect heat exchange (not shown) without departing from the scope of this invention. Various other methods known to those skilled in the art may be used to cool either the reaction mixture in conduit 8 or the catalyst in conduit 10 without departing from the scope of this invention.

Since the pressure differential between just below slide valve 13 and the upper portion of reaction zone 8 may vary to a considerable extent, it is necessary to control slide valve 13 to compensate for the pressure differential in order to obtain a constant flow of catalyst from standpipe 10 into conduit 8. This control of slide valve 13 is obtained by connecting a conventional differential pressure recorder 28 by means of conduits 27 and 31 to the upper and lower portions of standpipe 10, as shown, and transmitting changes in pressure differential to slide valve 13 so that when the pressure differential is increased valve 13 is closed slightly and when the pressure differential is decreased valve 13 is opened slightly. The concentration of the catalyst per cubic foot of gas in the vertical section of conduit 8 may be determined by connecting a conventional pressure differential recorder (not shown) on the vertical section of conduit 8 and calibrating the recorder readings in terms of concentration of catalyst.

The gaseous effluent from either conduit 18 or 19 is passed through filters 20 and 21 into outlet conduits 24 and 26, respectively. Usually only one outlet conduit is used at a time. Thus, for example, the gaseous effluent passes through outlet conduit 24 to conduit 33, through condenser 34 where the effluent is cooled to about 40° F. at operating pressure and then passed to accumulator 36. In accumulator 36, gaseous components are separated from liquid components of the cooled effluent. Uncondensed components of the effluent, such as hydrogen, carbon monoxide, methane, propylene, butylene, light naphtha, and oxygenated organic compounds, are recycled by means of conduits 38 and 44 and a compressor or blower 45 to the lower portion of conduit 8 in a ratio of about 1:1 to about 5 or 6:1 of volumes of recycle to volumes of fresh synthesis gas. The amount of unreacted hydrogen and carbon monoxide in the recycle gas determines how much the ratio of carbon monoxide and hydrogen in the reaction zone itself will deviate from the ratio in the fresh feed. As shown, the recycle gas is introduced into the fresh feed before the catalyst is introduced into the gaseous mixture; however, the recycle may be introduced into the gaseous mixture after the catalyst is introduced into the feed stream or the fresh feed gas may be introduced into the gaseous mixture after the introduction of the catalyst without departing from the scope of this invention.

After passage of the gaseous effluent through filter 20 for a time, the filter becomes coated and clogged with catalyst fines which have not settled out from the gaseous effluent. In order to remove these fines from the catalyst filters so as to ensure continuous passage of the gaseous effluent through the filters and so as to recover the catalyst, the course of gaseous effluent is changed to flow through filter 21 and conduit 26 and a portion of the uncondensed effluent is passed from accumulator 36 by means of conduit 38, compressor 41, and conduit 24 to filter 20. The pressure of the gas blows the fines from the filter into conduit 18. The fines then settle in conduit 18 to standpipe 10. Other gases than the uncondensed effluent may be used to remove the fines from the filter and may be introduced through line 42, if desired.

Liquid condensate in accumulator 36 is passed through conduit 39 to separating means 48, which may represent various separating units, such as distillation columns, absorption units, extraction units, and the like. In separating means 48, water is separated from organic compounds and removed through line 49; oxygenated organic compounds are separated therein and removed through line 51; and hydrocarbons are separated and removed through line 52.

Uncondensed gas from accumulator 36 not used for recycle, etc., is removed from the system through conduit 40 and passed to oil and chemical recovery equipment not shown.

It has been found that operating a synthesis process according to this invention, in which the synthesis gas is passed through a reaction zone at a high velocity, good yields of products are realized. Ordinarily one would believe that insufficient catalyst for accomplishing the desired reaction would be carried by the gas at such high velocities, but it has been found that within the range indicated sufficient catalyst is carried by the gas to effect the reaction between hydrogen and carbon monoxide. If desired, the synthesis gas entering conduit 8 may be preheated; but it has been found that preheating the gas is unnecessary in most instances and that the contact of the hot catalyst from standpipe 10 with fresh feed gases entering conduit 8 does not cause balling or agglomeration of the catalyst mass. It has also been found, as previously mentioned, that the wax and carbon content of the catalyst with extended use is much less than that observed in the conventional fluid-bed operations, and it is believed the reason for this is that catalyst eddy-currents are minimized in high velocity operations which greatly shortens the contact time between catalyst and reactants per pass. Longer catalyst life may also result from shorter residence time per se of the catalyst. The above theory is offered merely as a possible explanation of the extended life of the catalyst realized in the present invention and is not considered to unnecessarily limit the invention.

Fig. 2 of the drawings is another arrangement of apparatus suitable for carrying out this invention. The apparatus shown in Fig. 2 may be substituted for conduit 8 and standpipe 10 of Fig. 1. The filter sections of Figures 1 and 2 are the same. Accordingly, a synthesis gas comprising hydrogen and carbon monoxide is passed into a reaction zone 70 through a line 68. Reaction zone 70 comprises an elongated substantially vertical enclosed cylindrical shell having a bundle of open tubes 71 longitudinally positioned therein through which the gases pass upwardly into a cylindrical section 74 of a larger total cross-sectional area than the total cross-sectional area of tubes 71. Tubes 71 pass longitudinally through two vertically spaced tube sheets in shell 70 forming three consecutive zones. The outer surface of tubes 71 are sealed off to form an annular space 72 between the inner surface of the outer shell of reaction zone 70 and the outer surface of tubes 71. A cooling (or heating) fluid may be passed through annular space 72 to cool (or heat) the reaction mixture as it passes upwardly through tubes 71. Tubes 71 correspond to conduit 8 of Fig. 1. Upon reaching enlarged section 74 the velocity of the gaseous mixture is decreased to such an extent that the catalyst settles from the effluent and passes down through an enlarged conduit 73 into the lower portion of reaction zone 70 where the catalyst falls or is drawn into a high velocity gaseous stream passing upwardly into tubes 71. Conduit 73 is centrally located in shell 70 and projects through the tube sheets into the upper and lower zones formed thereby. The lower portion of reaction zone 70 and tubes 71 are of such a cross-sectional area that the catalyst is entrained in the gaseous stream.

The cooling medium is introduced into the annular space 72 through line 76 and is withdrawn therefrom through line 77.

The reaction effluent from reactor 70 passes upwardly through conduits 17, 18, and 19 of which the latter two contain filters as previously discussed with reference to Fig. 1. Conduits 17, 18, and 19 are the same as conduits 17, 18, and 19 of Fig. 1. The gaseous effluent passes from conduits 18 and 19 through outlet conduits 24 and 26 to conduit 33. The effluent in conduit 33 of Fig. 2 is condensed and separated according to the description of Fig. 1 and a portion of the uncondensed gases may be recycled (not shown) to conduit 68, if desired.

The cross-sectional area of conduits 71 with respect to the quantity of gases flowing therethrough is such that the velocity of the gases is greater than about 8 feet per second, while the cross-sectional area of enlarged section 74 is such that the velocity of the gases is below about 5 feet per second so that the catalyst may settle from the gaseous effluent. In section 74, the catalyst may form a dense pseudo-liquid catalyst phase having a concentration of catalyst greater than about 20 pounds or 25 pounds per cubic foot of gas. In such a case, reactor 70 has two reaction sections, tubes 71 in which the gas flows at a relatively high velocity and with a relatively low concentration of catalyst and enlarged section 74 in which the gas flows at a relatively low velocity and with a relatively high concentration of catalyst. The same effect may be achieved in the apparatus of Fig. 1 of the drawings by extending the length of section 16 and adjusting the cross section thereof such that the velocity of the gases therein are appropriate for the formation of a dense pseudo-liquid catalyst phase. In this manner, a high velocity continuous catalyst phase will exist in conduit 8 and a dense pseudo-liquid catalyst phase will exist in section 16.

A moveable valve 69 is provided at the lower end of standpipe 73 to control the flow and dispersion of the catalyst into the gaseous stream. Valve 69 may cause an aspiration effect by the deflection of the gases passing by and as a result of which the catalyst is drawn into the gaseous stream.

Fig. 3 gives a diagrammatic illustration in elevation of another arrangement of apparatus for the synthesis of hydrocarbons according to the present invention. The apparatus in Fig. 3 is very similar in operation to the apparatus of Fig. 1 and Fig. 2 and thus only a brief discussion of its operation will be included. A synthesis gas passes through a conduit 104 to a reaction chamber 106. Reaction chamber 106 comprises a bundle of reaction tubes 107 surrounded by a shell 108 to form an annular space 109 between the outside diameter of tubes 107 and shell 108. Annular space 109 is for the circulation of cooling fluid around reaction tubes 107 in order to maintain the temperature of reaction substantially constant. The cooling fluid, such as Dowtherm, enters annular space 109 through conduit 113. The pressure in annular space 109 is such that the Dowtherm boils below the desired temperature of reaction in tubes 107. The vaporized Dowtherm passes from annular space 109 through conduit 112 to an accumulator 114. From accumulator 114 vapors pass through line 115 to a condenser 116 in which substantially all of the Dowtherm vapor is condensed. Condensate from condenser 116 passes to accumulator 114 through conduit 118. From accumulator 114 liquid Dowtherm is recycled to annular space 109 through conduit 113. Any uncondensable vapors are removed from the system through conduit 117.

A reaction effluent comprising reaction products and finely-divided catalyst entrained in the reaction effluent is passed to a settling and accumulation chamber 120 through conduit 111. Chamber 120 comprises an upper settling chamber 121 into the lower portion of which the reaction effluent is introduced and a lower accumulation chamber 128 into which the catalyst settles. The cross-sectional area of settling chamber 121 is larger than the total cross-section of tubes 107 and is such that substantially all of the catalyst separates from the gaseous effluent and flows downwardly through a funnel-shaped septum 127 into the lower portion of accumulation chamber 128 which is sealed from chamber 121 by septum 127. Gases containing a small amount of catalyst "fines" pass upwardly in settling chamber 121 into a cyclone separator 122 positioned within the upper portion thereof. Gases from cyclone separator 122 are removed therefrom by conduit 123 and may be treated in the manner heretofore described. Separated catalyst "fines" are removed from cyclone separator 122 by means of a conduit 124 and are passed to funnel-shaped septum 127, as shown. Finely-divided catalyst accumulates in accumulation chamber 128 to a level above the end of the funnel 127 in order to prevent the passage of the gaseous effluent downwardly through funnel 127; however, gases may pass upwardly from chamber 128 through funnel 127 to chamber 121. An aeration or stripping gas, such as hydrogen or recycle gas, is introduced into the lower portion of accumulation chamber 128 through conduit 132 and is injected into the accumulated catalyst therein by means of dispersion means 133 which may comprise a perforated conduit or the like. Accumulator 128 may be maintained at a substantially higher pressure than settling chamber 121 by introducing a gas therein through conduit 131, if desired. By maintaining the pressure higher in chamber 128 than in chamber 121 passage of gaseous effluent into the accumulated catalyst is prevented. Pressuring gas and aeration gas may be passed, if desired, from chamber 128 to chamber 121 through conduit 134, or through the leg of funnel 127 whereby solids therein are maintained in an aerated condition aiding their flow to chamber 128. Alternatively, aeration or stripping gas may be passed from chamber 128 through conduit 131 if that conduit is not being used for the introduction of a pressuring gas.

Aerated or stripped catalyst from accumulator 128 passes through a conventional standpipe 129 to conduit 104 to be mixed with fresh feed gas.

Cyclone separator 122 may be omitted and in its place another type of separating means may be used, such as the filter means of Figures 1 and 2. The standpipes shown in the drawings are generally aerated with a suitable gas for that purpose. Various other modifications of Fig. 3 may become obvious to those skilled in the art without departing from the scope of this invention.

Assuming a reactor inlet gas volume of 25,000 standard cubic feet per hour, a reactor consisting of four tubes having an inside diameter of 2 inches would operate at a maximum linear velocity of 9 feet per second. Using a tube length of 36 feet, a velocity of 9 feet per second would correspond to about 4 seconds of contact time per pass, allowing for contraction. A reactor capable of a 40 feet per second linear velocity and 5 seconds contact time per pass would involve a flow path of about 200 feet in length. A single tube having a 2 inch inside diameter might be substituted for the four tubes having a 1 inch inside diameter with substantially the same velocity and throughput.

Various modifications and alterations of the apparatus and flow shown in Figures 1, 2, and 3 may be practiced by those skilled in the art without departing from the scope of this invention. Various coolers, condensers, distillation units, and other separating means have not been shown for a matter of convenience and simplicity, but their presence will be obvious to those skilled in the art. For examples of the use of the apparatus and particular process variables, reference may be had to the parent applications of which this application is a continuation-in-part.

We claim:

1. Apparatus for the synthesis of organic compounds in the presence of finely-divided suspended solids which comprises in combination an elongated reaction chamber having a shape factor greater than 10 and having an inlet, indirect heat exchange means for cooling said reaction chamber, a second chamber of enlarged cross-section connected to the upper portion of said reaction chamber and having a fluid outlet in the upper portion thereof for the separation of solids from gases, a vertical conduit communicating with the bottom of said second chamber and the inlet to said reaction chamber, a pressure differential responsive means, conduits communicating between said pressure differential means and the upper and lower portion of said vertical conduit, and a flow control valve responsive to said differential pressure responsive means to control the flow of solids through the lower portion of said vertical conduit.

2. Apparatus for the synthesis of organic compounds by the hydrogenation of an oxide of carbon in the presence of a finely-divided suspended catalyst which comprises in combination, an elongated reaction chamber having a major portion thereof substantially straight and positioned substantially vertically and having an inside tube diameter between about 1 and about 6.0 inches, a second chamber having a relatively larger cross-sectional area than said reaction chamber and connected to the upper portion of said reaction chamber, a substantially vertical conduit for the accumulation of finely-divided catalyst therein openly communicating between the lower portion of said second chamber and the inlet to said reaction chamber, a pressure differential responsive means, conduits communicating between said pressure differential means and the upper and lower portions of said vertical conduit, a valve responsive to said pressure differential means for the control of flow of finely-divided catalyst through said conduit to said reaction chamber, a branched conduit communicating with the upper portion of said second chamber, cylindrical filters substantially impermeable to fine solids positioned in said branched conduit and sealing off said branched conduit to the passage of finely-divided catalyst therethrough, a condenser, means for passing gases which have passed through said filters in said branched conduit to said condenser, an accumulator, means for passing resulting condensate and uncondensed vapors from said condenser to said accumulator, a conduit communicating between said accumulator and the downstream side of said filters in said branched conduit, a compressor positioned in the aforesaid conduit for passing gases from said accumulator to said filter means, means for passing uncondensed vapors from said accumulator to the lower portion of said reaction chamber, and means for cooling said reaction chamber.

3. Apparatus for the synthesis of organic compounds by the hydrogenation of carbon monoxide in the presence of a circulating finely-divided suspended catalyst which comprises in combination, a reaction chamber consisting of a single elongated conduit positioned substantially vertically for the reaction of hydrogen and carbon monoxide therein having a shape factor greater than 10 and having an inlet, indirect heat exchange means for cooling said reaction chamber, an enlarged conical section connected to the upper end of said reaction chamber and having a fluid outlet in the upper portion thereof for separation of solids from gases, means for passing gases from said reaction chamber to said conical section, a second conduit positioned substantially vertically for the accumulation of finely-divided catalyst therein connected to the bottom of said conical section, a pressure differential responsive means, conduits communicating between said pressure differential means and the upper and lower portions of said second vertical conduit, a flow control valve responsive to said pressure differential means to control the flow of finely-divided solids through said second vertical conduit, means for passing finely-divided solids from said second conduit to the inlet to said reaction chamber, a third conduit positioned substantially vertically having a relatively larger cross-sectional area than said first conduit connected to the top of said conical section, a branched conduit of substantially the same cross-sectional area as said third conduit connected to the top of said third conduit, and filter means substantially impermeable to fine solids positioned in said branched conduit preventing the flow of fine solids through said branched conduit.

4. Apparatus for the synthesis of organic compounds by the hydrogenation of a carbon oxide in the presence of a circulating finely-divided suspended solids which comprises in combination, a reaction chamber consisting of a single elongated conduit having a shape factor of at least 10 for the reaction of hydrogen and carbon oxide therein, the major portion of said conduit being straight and substantially vertical, indirect heat exchange means for cooling said reaction chamber, an enlarged enclosed vessel having a fluid outlet in the upper portion thereof for separating the solids from gases and connected for communication to the upper portion of said reaction chamber, a standpipe connected to the bottom of said enlarged vessel of sufficient length to pass finely-divided solids from said enlarged vessel to the inlet of said reaction chamber, a pressure differential responsive means, conduits communicating between said pressure differential means and the upper and lower portions of said second vertical conduit, a flow control valve responsive to said pressure differential means to control the flow of finely-divided solids through said second vertical conduit and filter means substantially impermeable to fine solids positioned within the upper portion of said enlarged vessel preventing the flow of fine solids with the outlet gases from said enlarged vessel.

5. Apparatus for the synthesis of organic compounds by the hydrogenation of carbon monoxide in the presence of a finely-divided suspended catalyst which comprises in combination, an elongated substantially vertical enclosed cylindrical shell, two substantially horizontal vertically spaced tube sheets separating said cylindrical shell into three consecutive zones, a bundle of open tubes passing longitudinally through the middle zone and projecting through said tube sheets for the passage of reaction mixture and catalyst upwardly therethrough, means for passing a cooling liquid into and from said middle zone and surrounding said tubes, an enlarged open conduit projecting through substantially the center of said tube sheets and communicating with said upper and lower zones for the passage of catalyst downwardly therethrough, a pressure differential responsive means, conduits communicating between said pressure differential responsive means and the upper and lower portions of said enlarged open conduit, a valve responsive to said pressure differential means to control the flow of finely-divided catalyst through said enlarged open conduit, means for passing a gas into the lower zone of said enclosed cylindrical shell. a branched conduit communicating with the upper zone of said cylindrical shell, and filters substantially impermeable to finely-divided catalyst positioned in said branched conduit to prevent the passage of catalyst but permit the passage of gas through said branched conduit.

6. Apparatus for conducting chemical reactions in the presence of a powdered catalyst comprising a closed cylindrical vessel, an inlet conduit at the bottom of said vessel, an outlet conduit at the top of said vessel, a tubular heat exchanger within said vessel and adapted to distribute powdered catalyst into a dense fluidized bed of catalyst above said heat exchanger, a standpipe disposed within said closed cylindrical vessel, surrounded by the tubular heat exchanger and communicating with the top and bottom of said vessel, a valve positioned at the bottom of said standpipe, means for actuating said valve in response to the pressure differential between the top and bottom of said vessel and deflecting means associated with said valve for deflecting reactant gases entering from said inlet conduit into the catalyst after said catalyst has passed through said valve.

7. Apparatus for conducting chemical reactions in the presence of a powdered catalyst comprising a closed cylindrical vessel, an inlet conduit at the bottom of said vessel, an outlet conduit at the top of said vessel, a tubular heat exchanger within said vessel and adapted to distribute powdered catalyst into a dense fluidized bed of catalyst above said heat exchanger, a standpipe having a flared upper portion above said heat exchanger and disposed within said closed cylindrical vessel surrounded by the tubular heat exchanger and communicating with the top and bottom of said vessel, means for introducing a gas into said standpipe, a valve positioned at the bottom of said standpipe, means for actuating said valve in response to pressure differential between the upper and lower portions of said standpipe, and deflecting means associated with said valve for deflecting reactant gases entering from said inlet conduit into the catalyst after said catalyst has passed through said valve.

8. Apparatus for conducting chemical reactions in the presence of a finely divided catalyst comprising a closed cylindrical vessel; an inlet conduit at the bottom of said vessel; an outlet conduit at the top of said vessel; a tubular heat exchanger within said vessel comprising an upper tube sheet displaced from the top of said cylindrical vessel, a lower tube sheet displaced from the bottom of said cylindrical vessel, a plurality of vertical transfer tubes terminating adjacent said upper and lower tube sheets; a standpipe disposed centrally of and passing through said tubular heat exchanger; said standpipe being adapted to conduct catalyst from above the upper tube sheet to below said lower tube sheet of said tubular heat exchanger; said upper tube sheet of said tubular heat exchanger forming with the upper portion of the walls of said cylindrical vessel a reaction chamber having a horizontal cross-sectional area greater than the total horizontal cross-sectional area of said tube transfer tubes; means for introducing gas into said standpipe; a valve to control the flow of finely-divided catalyst through said standpipe; means for actuating said valve in response to pressure differential in the upper and lower portions of said standpipe; and deflecting means associated with said valve for deflecting reactant gases entering from said inlet conduit into the catalyst after said catalyst has passed through said valve.

9. Apparatus for the synthesis of organic compounds in the presence of finely-divided suspended solids which comprises in combination an elongated reaction chamber having a shape factor greater than 10 and having an inlet, indirect heat exchange means for cooling said reaction chamber, a second chamber of enlarged cross-section for the separation of solids from gases connected to the upper portion of said reaction chamber and having a fluid outlet in the upper portion thereof, a substantially vertical conduit communicating with the bottom of said second chamber and the inlet of said reaction chamber, said reaction chamber, second chamber and conduit forming a path for circulating solids, a pressure differential responsive means, a valve responsive to said pressure differential responsive means to control the flow of solids through said substantially vertical conduit, conduit means for transmitting pressure from a point in said path just below said valve to said pressure differential means, and a second conduit means for transmitting pressure from the upper portion of said reaction chamber to said pressure differential means.

References Cited in the file of this patent

UNITED STATES PATENTS

| Number | Name | Date |
|---|---|---|
| 2,266,161 | Campbell et al. | Dec. 16, 1941 |
| 2,347,682 | Gunness | May 2, 1944 |
| 2,378,342 | Voorhees et al. | June 12, 1945 |
| 2,389,931 | Reed et al. | Nov. 27, 1945 |
| 2,425,098 | Kassel | Aug. 5, 1947 |
| 2,429,751 | Gohr et al. | Oct. 28, 1947 |
| 2,448,279 | Rubin | Aug. 31, 1948 |
| 2,451,803 | Campbell et al. | Oct. 19, 1948 |
| 2,472,377 | Keith | June 7, 1949 |
| 2,488,033 | Johnson | Nov. 15, 1949 |
| 2,500,516 | Carpenter | Mar. 14, 1950 |
| 2,526,651 | Garbo | Oct. 24, 1950 |